United States Patent [19]

Freeman

[11] Patent Number: 4,568,057
[45] Date of Patent: Feb. 4, 1986

[54] INNER INFLATABLE AND COLLAPSIBLE MOLD

[75] Inventor: Richard B. Freeman, Wilmington, Del.

[73] Assignee: The Budd Company, Troy, Mich.

[21] Appl. No.: 642,474

[22] Filed: Aug. 20, 1984

[51] Int. Cl.$^4$ .................... B29C 33/00; B29C 33/48; B29C 41/38
[52] U.S. Cl. .................................... 249/65; 249/122; 249/127; 425/417
[58] Field of Search .................. 249/65, 122, 127; 264/314; 52/203, 222, 384, 390, 391, 474; 425/417

[56] References Cited

U.S. PATENT DOCUMENTS

| | | | |
|---|---|---|---|
| 1,381,179 | 6/1921 | Gerson | 264/258 |
| 1,777,435 | 10/1930 | Hogelund | 52/203 |
| 2,644,198 | 7/1953 | Crawford | 264/238 |
| 2,897,668 | 8/1959 | Graham | 249/65 |
| 3,228,736 | 1/1966 | Beckerman | 220/84 |
| 3,334,175 | 8/1967 | Vincent | 220/84 |
| 3,561,633 | 2/1971 | Morrison | 220/84 |
| 3,619,432 | 11/1971 | Harrington | 249/65 |
| 3,854,620 | 12/1974 | Saidla | 220/84 |
| 3,937,781 | 2/1976 | Allen | 264/269 |
| 4,118,451 | 10/1978 | Schaus | 264/46.5 |
| 4,183,778 | 1/1980 | Mesnel | 264/261 |
| 4,212,406 | 7/1980 | Mittelmann | 220/84 |

Primary Examiner—Willard E. Hoag
Attorney, Agent, or Firm—Edward M. Farrell; Herman Foster; T. I. Davenport

[57] ABSTRACT

Methods and apparatus for producing an integral housing includes an inner and outer mold. A plurality of frames having plastic sheets are joined together to form the inner mold when pressurized inside of a rigid outer mold. The edges of the plastic sheets are sealed to prevent leakage of pressure.

8 Claims, 5 Drawing Figures

INNER INFLATABLE AND COLLAPSIBLE MOLD

BACKGROUND OF THE INVENTION

Inflatable inner molds have been used for making containers. Generally plastic or rubber bags have been inflated to provide the inner mold during the molding process and then deflated and removed after the process has been completed.

When the large housings or containers are to be molded, relatively large inflatable members are required. Single piece inflatable members generally involve seaming a number of small pieces, made of nylon or polyurethane, for example, to provide the large inflatable member. A problem using such seams is that they provide weak areas in the inflatable members which tend to result in leakages or breakage if the inner mold is not precisely dimensioned and located when pressures are applied to produce the inner mold. Heretofore, certain materials used for inflatable members, such as silicon or rubber, which can be seamed without weak joints, have been subject to attack by the resin materials used in the molding process.

The inner mold of the present invention is directed towards producing a seamless, one piece non-metallic shelter for applications, such as military use. Military shelters have generally involved the use of aluminum faced panels. Generally, these shelters do not have the high performance relating to resisting environmental degradation.

Some patents related to inflatable inner molds and features of the present invention include U.S. Pat. Nos. 2,644,198; 1,381,179; 3,937,781; 4,183,778 and 4,118,451.

OBJECTS OF THE INVENTION

It is an object of this invention to provide an improved, seamless, one piece non-metallic housing or shelter.

It is a further object of this invention to provide an improved removable and disposable inner mold for a molding process.

It is still a further object of this invention to provide an improved inner mold in which improved means for sealing a plurality of pieces is provided.

BRIEF SUMMARY OF THE INVENTION

In accordance with the present invention, a plurality of fiberglass wrapped foamed panels are placed within a mold comprising an outer rigid mold and an inner mold. The inner mold comprises a removable closed assembly including flexible joined surfaces for receiving pressure therein. Resin is then injected into the cavity formed by the inner and outer molds to produce an integral housing.

Other objects and advantages of the present invention will be apparent and suggest themselves to those skilled in the art, from a reading of the following specification and claims taken in conjunction with the accompanying drawings.

DESCRIPTION OF THE INVENTION

Figure 1:
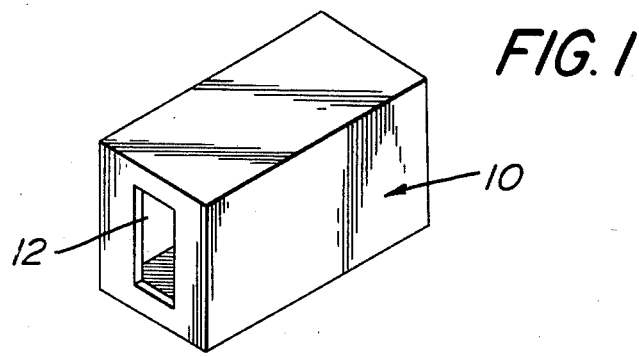
FIG. 1 is an isometric view illustrating a typical integral housing, in accordance with the present invention.

Referring to FIG. 1, an integral housing or shelter 10 provides a molded non-metallic shelter or enclosure. An opening 12 may be provided for a door and also serve as means for removing an inner mold after a molding operation.

Generally, the inner mold involved in the present invention may involve six somewhat similar assemblies all having a number of parts which must be assembled individually inside of the shelter to be molded. After the six assemblies are in place, means for sealing the joining areas and corners of the assemblies must be provided. The completed sealed assemblies provide the inner mold of the present invention. Basically, each of the assemblies include four angle members having a nylon film attached thereto. One such assembly is illustrated in FIG. 2.

Figure 2:
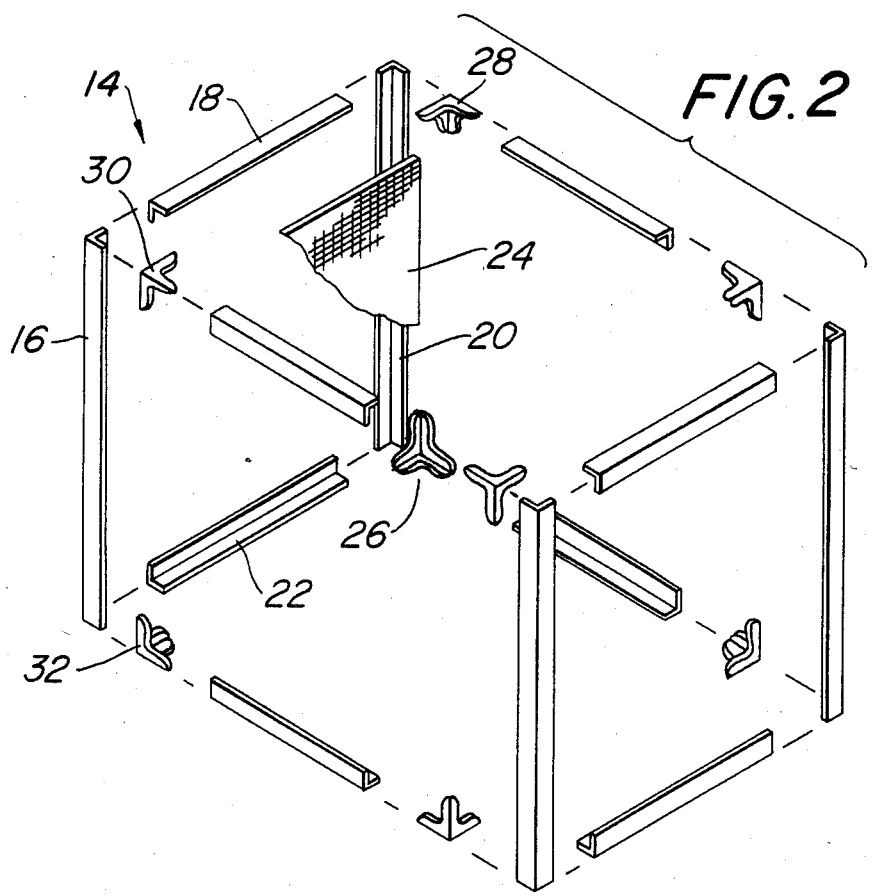
FIG. 2 is an exploded view illustrating one of six panels of the inner mold having film material thereon, in accordance with the present invention.

Referring to FIG. 2, only one of six assemblies 14 will be described in connection with one side of a housing assembly, it being understood that the other sides, including the top and bottom, include similar members connected together in substantially the same manner. The assembly 14 of one side comprises four angle members 16, 18, 20 and 22. The angle members are adapted to receive a nylon sheet 24 thereon. Corner members 26, 28, 30 and 32 are provided to join the various angle members.

The various details relating to the joining the frames with the film sheets together will be more clearly described in connection with FIGS. 4 and 5.

Before describing how the inner mold comprising the frames with the nylon sheets are joined together, a molding operation wherein the inner mold of the present invention is used will be generally described.

Generally, in one embodiment of the invention used to make an enclosure, as illustrated in FIG. 1, involves the steps of putting six foam panels inside of a mold. The foam panels are prewrapped with a material adapted to be impregnated using a resin transfer molding process. The basic idea involved is to provide an outer rigid shell or mold for the foam panels and to provide an inner mold of the type involved in the present invention. After the inner and outer molds are in place around the wrapped foam panels, resin under pressure is injected into the material wrapped around the panels to produce a seamless one-piece non-metallic container as illustrated in FIG. 1.

Figure 3:
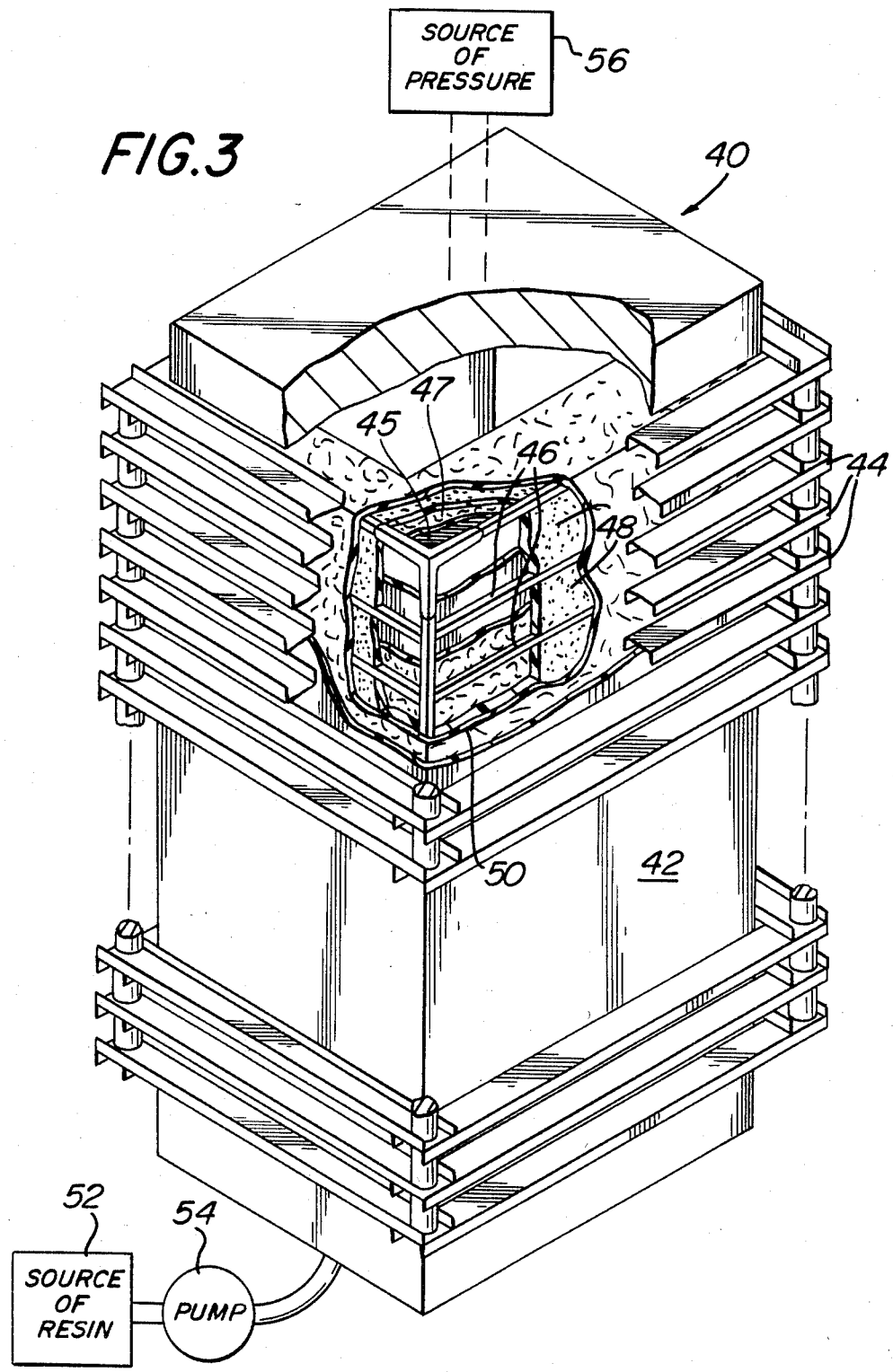
FIG. 3 is a view, partly broken away, illustrating the members involved in the molding operation, in accordance with the present invention.

As illustrated in FIG. 3, the mold 40 comprises a rigid aluminum shell 42 having a strong reinforcement frame 44. The foam panels, mentioned previously, are formed by high density foam frame 46 and low density foam material 48. The foam panels each include an outer skin 50.

The outer skin 50 surrounding the foam panels is made of a fibrous material adapted to receive resin therein. When resin is injected into the system from a source 52 by means of a pump 54, the skin material 50 becomes impregnated with the resin. After it has been properly cured, a hard external surface is provided around all of the panels which make up the enclosure 10.

While the inner mold 45 is not illustrated in detail in FIG. 3, the inner mold is first assembled inside of the panels which make up the shelter. A separate inner skin 47 may be provided.

After the inner mold is in place, a source of pressure 56, which may be any suitable gas, is applied to the inner mold. After the inner and outer molds are in place and the inner mold is pressurized, resin from the source 52 is injected to impregnate the fibrous skin 50 to form a hard exterior shell for all the foam panels. Because all of the details relating to the foam and resin operation is not directly related to the present invention, they are not illustrated in detail. A corresponding patent application entitled "Electro-Magnetic Interference Shield" assigned to the same assignee as the present invention, and filed concurrently herewith, filed Nov. 13, 1984, Ser. No. 642,005, further illustrates the type of foam and panels and the resin impregnation process.

Figure 4:
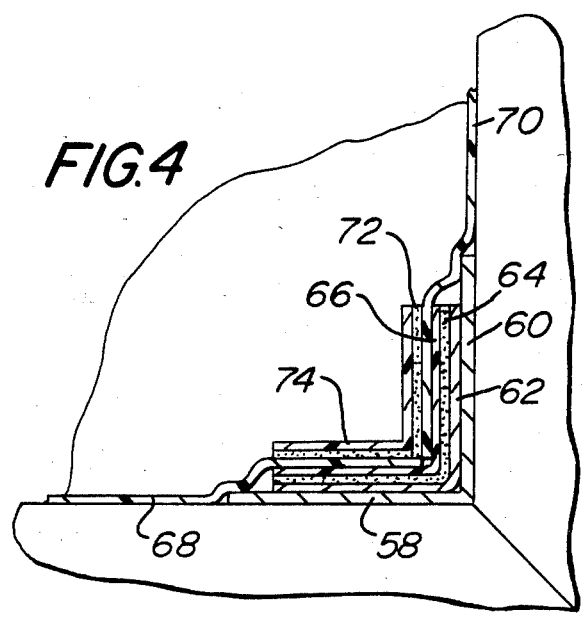
FIG. 4 is a cross-sectional view illustrating the joining and sealing of the frames and film material illustrated in FIG. 2.

Referring to FIG. 4, there is illustrated a means for joining the edges of the various frames illustrated in FIG. 2. Only one joint between the frames will be illustrated, it being understood that all the frames are joined in a substantially similar manner. After the parts for the frames have been brought into the panels to form the shelter, they are assembled, joined and sealed to provide the inner mold. Means are provided to join the frames formed by the angle members of FIG. 2 and also to join the adjacent nylon film sheets so as to have an inner mold capable of receiving pressure with the joined areas preventing leakage when gas under pressure is pumped into the assembly comprising the inner mold.

An angle member comprising surfaces 58 and 60 (FIG. 4) is considered to be typical of all the angle members illustrated in FIG. 2. After the angle member has been installed (with the foam panels already in place), means for sealing and receiving the nylon sheet are provided. A strip of nylon 64 having sealants 62 and 66 on opposite sides thereof is inserted on the surfaces 58 and 60 of the angle member. The strip 64 with the sealants are pre-made. The nylon strip with its sealants is applied around all of the angle members, with four such members providing a single frame. The strip 64 also provides bridging strength at the corners.

The edges of the nylon sheets 68 and 70 are then secured to the layer of sealant 66.

After the nylon sheets 68 and 70 are in place, a second pre-made nylon strip 74 having a sealant 72 is secured to the nylon sheets all around the angle members making up the frames. The multiple sealants and nylon strips assure that the nylon sheets are adequately joined together and not subject to leakage. The nylon strip 74 provides bridging strength and the corners and the possible leakage paths through the sealants at the corners are lengthened.

All the corners of the angle members making up the frames are joined together in the same manner as illustrated in FIG. 4. In the case of the corners, however, three frames and film sheets must be joined together.

Figure 5:
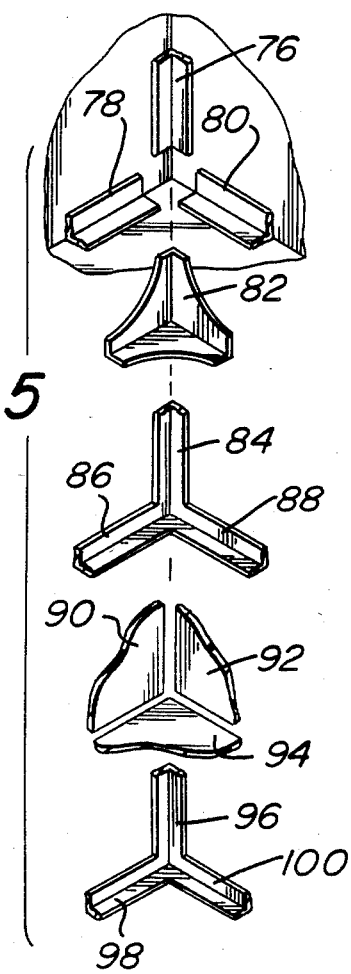
FIG. 5 is an exploded view illustrating the corner connections and sealing of a number of panels, of which one is illustrated in FIG. 2.

Referring to FIG. 5, three angle members 76, 78 and 80 having a space therebetween is adapted to receive a corner bracket 82. Sections 84, 86 and 88 having sealants on both sides of nylon strip are adapted to fit into the corner bracket 82. The various tape sections 84, 86 and 88 with their sealants are continuations of a tape such as nylon strip 64 with sealants 62 and 66 applied on either side.

The corners of the nylon film sheets 90, 92 and 94 are adapted to fit into the tapes 84, 86 and 88 which include the sealant thereon. Following the installation of the nylon strips, a group of tapes 96, 98 and 100 are inserted. The tape sections 96, 98 and 100 have adhesive applied to one side. The tapes 96 and 98 and 100 may be continuations of strips such as strip 72 illustrated in FIG. 4 having a sealant 72 and nylon strip 74 thereon.

It is thus seen that the present invention provides adequate sealing where the edges of the nylon sheets join as well as sealing the corners where three areas of the nylon films and frames meet. The multiple layers of sealant and use of nylon strips assures a strong seal to prevent leakage or rupture of the inflatable bag when pressure is applied to the interior mold.

What is claimed is:

1. In a molding apparatus having inner and outer molds for use in forming a molded housing structure; the improvement, comprising: the inner mold having
   (a) a plurality of frames for receiving film sheets thereon;
   (b) means for joining said frames into a framework for said inner mold;
   (c) means for attaching said film sheets to said frames;
   (d) means for sealing areas at which said frames are joined, and,
   (e) said means for sealing comprising sealent on opposite sides of said film sheets and said frames, said opposite sides being the inside and the outside of said sheet as installed and, (f) means for applying pressurized gas to said inner mold.

2. An inner mold as set forth in claim 1 wherein a tape is provided to receive a first and second sealant between the frames and the inner sides of said film sheets, said sealants being applied to both sides of said tapes.

3. An inner mold as set forth in claim 2 wherein a second tape is provided to receive a third sealant between said second tape and the outer sides of said film sheets.

4. An inner mold as set forth in claim 3 wherein corner fittings are provided at the corners of said joined panels.

5. An inner mold as set forth in claim 4 wherein said film sheets comprise nylon.

6. An inner mold as set forth in claim 5 wherein said first and second tapes comprise nylon.

7. An inner mold as set forth in claim 6 wherein said first and second tapes with their sealants extend on opposite sides of said corner fittings.

8. An inner mold as set forth in claim 7 wherein said joined and sealed frame members provide an enclosure capable of receiving and holding gas under pressure to provide said inner mold.

* * * * *